Dec. 1, 1953     A. P. LIEN ET AL     2,661,382
PREPARATION OF ETHYLXYLENES
Filed July 25, 1951
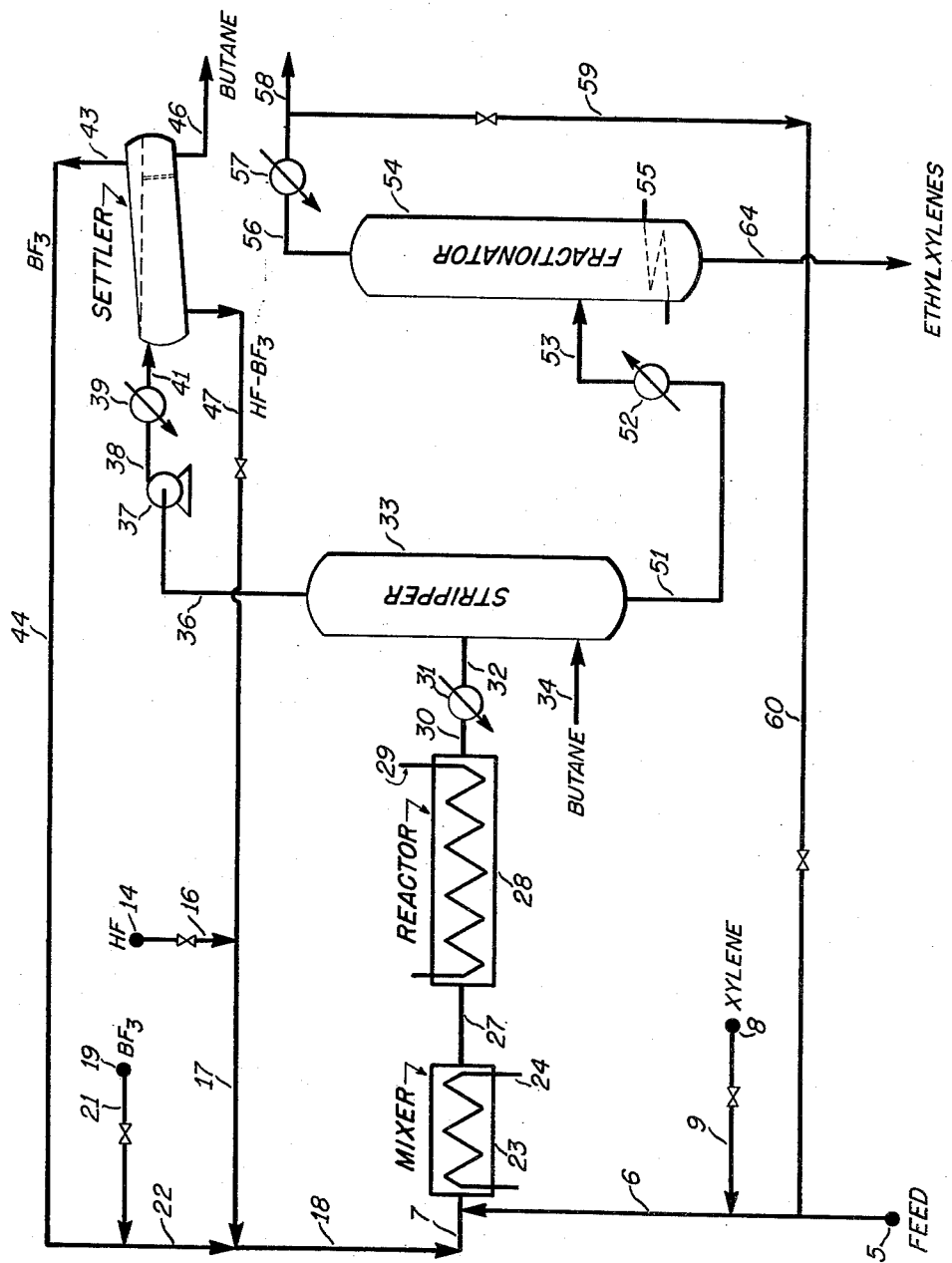
INVENTORS:
Arthur P. Lien
David A. McCaulay
BY Michael Definacy
ATTORNEY Patented Dec. 1, 1953

2,661,382

UNITED STATES PATENT OFFICE 2,661,382

PREPARATION OF ETHYLXYLENES

Arthur P. Lien, Highland, Ind., and David A. McCaulay, Chicago, Ill., assignors to Standard Oil Company, Chicago, Ill., a corporation of Indiana Application July 25, 1951, Serial No. 238,498

14 Claims. (Cl. 260—671)

This invention relates to the preparation of ethylxylenes by the reaction of ethylbenzene and xylene. More particularly, the invention relates to the preparation of the symmetrical 1,3,5-ethylxylene.

The commercial polystyrene resins have the disability of a softening point lower than the boiling point of water. It is known that resins prepared from dimethylstyrene have a softening point higher than the boiling point of water. Ethylxylenes with an ortho arrangement of a methyl and the ethyl group dehydrogenate to methylindenes, which are very difficult to separate from the dimethylstyrene. The methylindenes act as plasticizers and lower the softening point of the polydimethylstyrene, the presence of about 6% of these contaminants in the resin lowers the softening point below the boiling point of water. In the prior art processes, the ethylxylenes having the undesirable ortho relation between a methyl and the alkyl group are the predominant product.

It is an object of this invention to react xylene and ethylbenzene under controlled conditions and in the presence of a catalyst consisting of liquid HF and $BF_3$ to produce ethylxylenes which are predominantly 1,3-dimethyl-5-ethylbenzene. Another object is to prepare 1,3,5-ethylxylene of high purity.

We have previously discovered that xylenes, ethylxylenes and polyethylxylenes react with $BF_3$ and liquid HF to form a complex containing 1 mol of $BF_3$ per mol of xylene and probably 1 mol of HF per mol of xylene; these complexes are very soluble in liquid HF. Benzene and ethylbenzene do not form a complex with $BF_3$ under the conditions of our process. It is necessary in our process that sufficient liquid HF be present to dissolve all the $BF_3$-xylene (ethylxylene) complex formed. The presence of liquid HF in excess of this amount is preferable. Thus the amount of liquid HF should be between at least about 2 mols per mol of xylene present in the feed and about 50 mols. Put in another way, the amount of liquid HF used should be between about 20 volume percent to about 600 volume percent (based on xylenes charged); preferably, between about 100 to about 300 volume percent should be used. Since water reacts very rapidly with $BF_3$ to form undesired hydrates the liquid HF should be substantially anhydrous and in no case should more than 1 to 2% of water be present.

The amount of $BF_3$ used in our process must be less than that amount needed to complex all the xylene charged and yet must be enough to bring all the xylene and ethylbenzene into solution in the liquid HF. That is, the liquid HF must contain xylene in the form of a $BF_3$-xylene complex and as free xylene in simple physical solution. The $BF_3$-xylene complex acts as a solubility promoter for uncomplexed aromatics. The solubility of xylene, ethylbenzene, toluene and benzene in $BF_3$-xylene complex containing liquid HF is markedly higher than the solubility of these aromatics in pure liquid HF. The ability of the liquid HF to dissolve ethylbenzene increases with increase in the amount of $BF_3$-xylene complex present in the liquid HF. In general, we prefer to use between about 0.7 to about 0.9 mol of $BF_3$ per mol of xylene in the feed. In this specification the term "single phase system" will mean a solution in liquid HF of all the ethylbenzene and xylenes present in the feed to the reaction, with only a part of the xylenes present in the form of a $BF_3$-xylene complex.

Ethylbenzene is rapidly disproportionated by liquid HF—$BF_3$ to diethylbenzene, triethylbenzene and benzene. The presence of $BF_3$-xylene complex in the liquid HF tends to suppress the formation of triethylbenzene. Nearly complete disproportionation of the ethylbenzene to diethylbenzene can be obtained by using enough $BF_3$ to complex all the xylenes present and all the diethylbenzene formed in the reaction. We have discovered that the system liquid HF—$BF_3$ will catalyze the reaction of ethylbenzene and xylene to produce ethylxylenes and benzene when the molal ratio of xylene to ethylbenzene in the reaction mixture is in excess of 1 and when xylenes are present in the liquid HF—$BF_3$ complex system in free solution, i. e. not in the form of a $BF_3$-xylene complex. Furthermore, as the ratio of xylene to ethylbenzene increases, the disproportionation of ethylbenzene is suppressed more and more until finally substantially no diethylbenzene formation occurs; under these conditions the xylene-ethylbenzene reaction mixture produces only ethylxylene and benzene.

In general, the xylene to ethylbenzene molal ratio must be greater than 1 in order to obtain appreciable yields of ethylxylenes. In order to reduce the formation of the unwanted diethylbenzene, the xylene/ethylbenzene ratio should be at least about 1.6; the xylene/ethylbenzene ratio may be as great as 10 or more. We prefer to operate at a xylene/ethylbenzene ratio between about 2.5 and 5.

While we are not certain as to the mechanism of our process, we believe that the ethyl group adds to the xylene and forms several, if not all, the isomeric ethylxylenes. After the ethyl group addition, isomerization takes place whereby the ethylxylene isomers are converted to the symmetrical 1,3,5-ethylxylene configuration. This configuration forms the most stable complex with BF₃. We have found that the ethylxylene isomer distribution produced is dependent upon both temperature and reaction time.

The reaction temperature that may be used is limited by the fact that at higher temperatures the unreacted xylenes disproportionate to form polymethylbenzenes, toluene and benzene. The tendency of the ethylxylenes to crack and form tarry materials imposes an upper limit of about 160° F. on the reaction temperature. We have found that xylenes disproportionate in appreciable amounts when held at temperatures in excess of 100° F. for several hours; for example, when a single phase homogeneous system of meta-xylene, BF₃ and HF was held at 86° F. for 24 hours, about 2% of the meta-xylene was disproportionated into toluene and trimethylbenzene. In order to avoid the loss of xylene and ethylxylenes, the reaction temperature should be maintained at the lowest point consistent with satisfactory reaction times and with conversion to the desired 1,3,5-ethylxylene form. Lowering the temperature of the reaction decreases the rate of reaction and of the isomerization of the ethylxylenes. However, temperatures as low as 0° F. or lower can be used if the correspondingly longer reaction time is used. In the operable temperature range, the amount of ethylbenzene reacted reaches a minimum of about 80%. At 160° F., the maximum conversion is reached in about 15 minutes. At 60° F., the reaction time for maximum conversion is in excess of 60 hours. We prefer to operate between about 120° F. and 140° F. at reaction times between about 30 minutes and 2 hours, the longer times correspond to the lower temperatures.

The xylenes charged to our process can be any one of the three isomers or any mixture thereof. The most desirable xylene is the meta-isomer. Meta-xylene reacts with ethylbenzene to form 1,3,5-ethylxylene to the virtual exclusion of the other ethylxylene isomers. When using para-xylene, ortho-xylene, mixtures thereof, or mixtures of these and meta-xylene, it may be necessary to extend the reaction time, beyond that needed to complete the xylene-ethylbenzene reaction, in order to isomerize the ethylxylene mixture and obtain 1,3,5-ethylxylene of high purity. Para-xylene and ortho-xylene disproportionate much more readily than meta-xylene. In general, lower temperatures should be used when either or both of these isomers are present in the charge to the reaction. About 140° F. is the upper temperature limit and a suitable operating temperature is about 120° F.

The following typical runs illustrate the experimental procedure used and the results obtainable by our process. The runs were carried out in a 1570 ml. carbon steel autoclave fitted with a 1725 R. P. M. stirrer.

Run 1

Meta-xylene, 2.45 mols, and 0.84 mol of ethylbenzene were charged to the reactor. 450 ml. of liquid HF—150 volume percent on xylene—was then added to the reactor. BF₃ was pressured into the reactor from a cylinder; a total of 1.72 mols of BF₃ were added—0.70 mol per mol of xylene. The temperature of the reactor contents was maintained at 68° F. for 41 hours. The contents were withdrawn into a Dry-Ice cooled flask containing about 600 ml. of water. Insofar as could be determined by visual observation, only a single phase system had existed in the reactor.

The flask was allowed to warm to room temperature. The contents were transferred to a separatory funnel, where the supernatant hydrocarbons—displaced from their BF₃ complexes by the water—were separated from the aqueous acid phase. The hydrocarbons were washed with dilute aqueous caustic to remove traces of HF and BF₃. The hydrocarbons were fractionated through a column of 30 theoretical plates. The distillation separated the product into fractions according to number of carbon atoms. The composition of each fraction was determined by a combination of ultraviolet absorption, infrared absorption, refractive index and specific gravity. The total product distribution in this run was,

| Hydrocarbons | Mols | Percent |
| --- | --- | --- |
| Benzene | 0.54 | 16.4 |
| o-Xylene | .06 | 1.8 |
| m-Xylene | 1.66 | 50.5 |
| p-Xylene | .14 | 4.2 |
| Ethylbenzene | .27 | 8.2 |
| 1,3,5-ethylxylene | .61 | 18.6 |
| Other ethylxylenes | .01 | 0.3 |
| Diethylbenzene | Trace | |

Ethylbenzene conversion: 68%.

The properties of the total ethylxylene product and properties of 1,3,5-ethylxylene as given by Birch et al. in Petroleum Preprints, A. C. S. Spring 1948, p. 135, are:

| | Run 1 | Birch et al. |
| --- | --- | --- |
| B. P., ° C | 184 | 183.65 |
| $N_D^{20}$ | 1.4981 | 1.4981 |
| Sp. gr | 0.865 | 0.8644 |

Run 2

In this run, the feed consisted of 2.43 mols of m-xylene and 0.83 mol of ethylbenzene. The amount of liquid HF used was 150 volume percent on xylene. The BF₃ addition amounted to 0.72 mol per mol of xylene. The contents of the reactor were maintained at 146° F. for a reaction time of 30 minutes. At the end of this time, the reactor contents were withdrawn into a Dry-Ice cooled flask containing water. Inspection of the contents as they were being withdrawn, indicated only a single phase system had existed therein.

The contents of the reactor were handled in the manner described in Run 1. The total product distribution in this run was,

| Hydrocarbons | Mols | Percent |
| --- | --- | --- |
| Benzene | 0.58 | 17.8 |
| o-Xylene | .17 | 5.2 |
| m-Xylene | 1.42 | 43.5 |
| p-Xylene | .23 | 7.1 |
| Ethylbenzene | .20 | 6.1 |
| 1,3,5-ethylxylene | .66 | 20.3 |
| Other ethylxylenes | Trace | |
| Diethylbenzene | .00 | |

Ethylbenzene conversion: 76%.

Large scale operation

The accompanying drawing shows one embodiment of our process for the production of high purity 1,3,5-ethylxylene by the reaction of xylenes and ethylbenzene. It is to be undertood that this embodiment is shown for purposes of illustration only and that many other variations of our process can be readily devised by those skilled in the art.

In this illustration the charge consists of a mixture of m-xylene, p-xylene and ethylbenzene. The charge was derived from the product of the hydroforming of a virgin naphtha. The "xylene cut" which contained about 21% o-xylene was fractionated in order to separate the o-xylene. The remainder consists of: ethylbenzene, 15%; m-xylene, 61%; and p-xylene, 24%. The charge from source 5 is passed through line 6 into line 7. In the case where the feed contains a high percentage of ethylbenzene, xylenes can be added from source 8 through line 9 to increase the xylene to ethylbenzene ratio. Liquid HF from source 14 is passed through valved line 16 through line 17, through line 18 into line 7. The amount of liquid HF used may vary between about 20 volume percent and 600 volume percent based on xylene charged; in this example we use 150 volume percent of liquid HF. BF₃ from source 19 is passed through valved line 21 into line 22 and line 18 where it is commingled with the liquid HF. The amount of BF₃ used may vary from about 0.7 to about 0.9 mol per mol of xylene charged; we prefer to use in this example about 0.75 mol of BF₃ in order to insure that all the free xylene and ethylbenzene will be dissolved into the liquid HF and form a single phase system. The liquid HF—BF₃ in line 18 joins the charge in line 7 and the contents of line 7 pass into mixer 23. Mixer 23 may be any form of device that provides thorough agitation of the HF—BF₃ and charge, for example, an orifice mixer. The reaction of the BF₃, HF and xylene to form the complex is exothermic and mixer 23 is provided with a cooling coil 24 to enable the temperature of the reaction mixture to be controlled. Reactor 28 is provided with a coil 29 which is used to maintain the temperature of the reaction mixture relatively constant. Preferably the reaction temperatures should be between about 120° and 140° F.; in this example we operate at about 140° F. The reactants are held in reactor 28 for a time sufficient to obtain reaction and isomerization of the ethylxylenes into the desired symmetrical 1,3,5-ethylxylene configuration. At the operating conditions used in this example a suitable reaction time is about 60 minutes.

From reactor 28 the single phase system passes into line 30 and on into cooler 31. The reaction mixture is cooled quickly in cooler 31 in order to decrease the degree of disproportionation of the xylene which takes place readily at this high temperature. From cooler 31 the mixture passes through line 32 into stripper 33. In stripper 33 the HF and BF₃ are removed from the hydrocarbons. In order to avoid the formation of undesirable products through disproportionation and cracking, the removal of the HF and BF₃ is carried out under a vacuum; the stripping operation can be facilitated if a stripping agent, such as butane, is introduced into stripper 33 through line 34. The HF and BF₃ pass out of stripper 33 through line 36 through vacuum pump 37 and line 38 into condenser 39. In condenser 39 the butane and HF are liquefied and the liquids pass through line 41 into settler 42. The free BF₃ passes out of settler 42 through lines 43 and 44 to line 22 for reuse in the process. The liquid butane passes out of settler 42 through line 46 and may be returned to line 34 for reuse in the stripping operation. The liquid HF saturated with BF₃ passes out of settler 42 through valved line 47 into line 17 and is reused in the process.

The hydrocarbons pass out of stripper 33 through line 51 through heater 52 and line 53 into fractionator 54. Fractionator 54 is provided with a reboiler 55, which reboiler in conjunction with heater 52 provides the heat necessary to separate the hydrocarbons into the respective fractions. The unreacted xylene and ethylbenzene portion passes overhead from fractionator 54 through line 56 and is condensed in cooler 57. This fraction may be sent to storage through line 58 or may be recycled to the reactor through valved lines 59 and 60 to line 6. The ethylxylene fraction, which in this case is substantially pure 1,3,5-ethylxylene, is withdrawn from the bottom of fractionator 54 through line 64 to storage.

We claim:

1. A process for the preparation of a mixture of ethylxylenes, which mixture consists predominantly of 1,3,5-ethylxylene, which process comprises forming a single phase liquid system by treating a feed mixture consisting essentially of a xylene and ethylbenzene, wherein the xylene/ethylbenzene ratio in said feed is greater than 1, with liquid HF in an amount of at least about 2 mols per mol of xylene in said feed, and with BF₃ in an amount between about 0.7 mols and less than 1 mol per mol of xylene in said feed, whereby a BF₃—HF-xylene complex and free-xylene both exist in said single phase liquid system; maintaining said single phase liquid system at a temperature of less than about 160° F. for a time sufficient to produce a hydrocarbon product containing an appreciable amount of ethylxylenes wherein 1,3,5-ethylxylene is the predominant isomer; removing HF and BF₃ from said hydrocarbon product and recovering said ethylxylene mixture from said hydrocarbon product.

2. The process of claim 1 wherein the xylene/ethylbenzene ratio is between about 1.6 and 10.

3. The process of claim 1 wherein the BF₃/xylene molal ratio is between about 0.7 and 0.9.

4. The process of claim 1 where the amount of liquid HF is between about 20 and 600 volume percent, based on xylene.

5. The process of claim 1 wherein the reaction temperature is between about 60° F. and below about 160° F. and the reaction time is between about 30 minutes and 60 hours, the longer time corresponds to the lower temperature.

6. The process of claim 1 wherein the xylene is meta-xylene.

7. The process of claim 1 wherein the xylene is a mixture of meta-xylene and para-xylene.

8. The process of claim 1 wherein said feed mixture consists essentially of a mixture of C₈ aromatic hydrocarbons wherein the xylene/ethylbenzene ratio is greater than 1.

9. A process for the production of a high purity 1,3,5-ethylxylene, which process comprises forming a single phase liquid system by treating a feed mixture consisting essentially of a xylene and ethylbenzene, wherein said feed contains between about 1.6 and 10 mols of xylene per mol of ethylbenzene, with liquid HF, in an amount between about 20 and 600 volume percent, based on said xylene, and with BF₃ in an amount between about 0.7 and 0.9 mols per mol of said xylene, whereby said single phase liquid system contains both a BF₃—HF-xylene complex and free-xylene; maintaining said single phase liquid system at a temperature between about 60° and 160°

F. for a time between about 30 minutes and 60 hours wherein the longer times correspond to the lower temperatures; removing HF and $BF_3$ from a hydrocarbon product and recovering from said hydrocarbon product an ethylxylene mixture which corresponds to a high purity 1,3,5-ethylxylene.

10. The process of claim 9 wherein the molal ratio of xylene to ethylbenzene is between about 2.5 and 5.

11. The process of claim 9 wherein the amount of liquid HF is between about 100 and 300 volume percent, based on xylene.

12. The process of claim 9 wherein the reaction temperature is between about 120 and 140° F. and the reaction time is between about 30 minutes and 2 hours, the longer time corresponds to the lower temperature.

13. The process of claim 9 wherein said xylene is meta-xylene.

14. The process of claim 9 wherein said xylene is a mixture of meta-xylene and para-xylene.

ARTHUR P. LIEN.
DAVID A. McCAULAY.

References Cited in the file of this patent

UNITED STATES PATENTS

| Number | Name | Date |
|---|---|---|
| 2,373,062 | Stahly | Apr. 3, 1945 |
| 2,396,966 | Passino | Mar. 19, 1946 |
| 2,408,753 | Burk | Oct. 8, 1946 |
| 2,521,444 | Brooke et al. | Sept. 5, 1950 |
| 2,528,893 | Lien et al. | Nov. 7, 1950 |
| 2,563,826 | Elwell et al. | Aug. 14, 1951 |